(12) United States Patent
Hering et al.

(10) Patent No.: US 9,192,263 B2
(45) Date of Patent: Nov. 24, 2015

(54) FOOD TOASTING POUCH

(75) Inventors: Dean Howard Hering, Raleigh, NC (US); John Robert Dixon, Herndon, VA (US); Robert John Dougherty, Herndon, VA (US)

(73) Assignee: Netcentrics Corporation, Raleigh, NC (US)

( * ) Notice: Subject to any disclaimer, the term of this patent is extended or adjusted under 35 U.S.C. 154(b) by 777 days.

(21) Appl. No.: 12/999,679

(22) PCT Filed: Jun. 19, 2009

(86) PCT No.: PCT/US2009/047889
§ 371 (c)(1),
(2), (4) Date: Dec. 17, 2010

(87) PCT Pub. No.: WO2009/155478
PCT Pub. Date: Dec. 23, 2009

(65) Prior Publication Data
US 2011/0091621 A1    Apr. 21, 2011

Related U.S. Application Data

(60) Provisional application No. 61/074,208, filed on Jun. 20, 2008.

(51) Int. Cl.
*A47J 37/06* (2006.01)
*A47J 37/08* (2006.01)

(52) U.S. Cl.
CPC .................................. *A47J 37/0885* (2013.01)

(58) Field of Classification Search
USPC .............. 426/110, 82, 466, 520, 113; 99/385, 99/391, 400, 402, 450, 449
See application file for complete search history.

(56) References Cited

U.S. PATENT DOCUMENTS

| | | | |
|---|---|---|---|
| 3,891,775 A * | 6/1975 | Murray et al. ................. | 426/107 |
| 5,347,917 A * | 9/1994 | Vezzani et al. .................. | 99/335 |
| 5,853,781 A * | 12/1998 | Bono et al. ..................... | 426/110 |
| 6,176,175 B1 * | 1/2001 | Moreth ........................... | 99/408 |
| 7,970,699 B1 | 6/2011 | Bramlage et al. | |
| 2003/0196559 A1 * | 10/2003 | Friel, Sr. ........................ | 99/385 |
| 2005/0089617 A1 * | 4/2005 | Unwin .......................... | 426/523 |

* cited by examiner

*Primary Examiner* — Drew E Becker
*Assistant Examiner* — Preston Smith
(74) *Attorney, Agent, or Firm* — NSIP Law

(57) ABSTRACT

A food toasting device comprising a pouch and optionally, a handle. A method of using the food toasting device comprising placing a desired quantity of a food product, such as nuts, in the pouch of the food toasting device, placing the food toasting device into an appliance for heating, turning on the appliance so that the food product is exposed to the desired amount of heat, waiting until the food product is sufficiently toasted, and removing the food toasting device containing the food product from the appliance.

14 Claims, 7 Drawing Sheets

FOOD TOASTING POUCH

CROSS-REFERENCE TO RELATED APPLICATIONS

This application is filed under the provisions of 35 U.S.C. §371 and claims the benefit of International Patent Application No. PCT/US2009/047889, filed on Jun. 19, 2009, entitled "Food Tasting Pouch" in the name of Dean Howard Hering, et al., which claims priority of Provisional Patent Application No. 61/074,208, filed on Jun. 20, 2008, both of which are hereby incorporated by reference herein in their entirety.

FIELD OF THE INVENTION

This invention relates to a device for the toasting of food, such as nuts, and methods of using the same.

BACKGROUND OF THE INVENTION

Toasted nuts have become quite popular and are recommended in many recipes for baked goods, salads, and other foods. At present the recommended way to toast nuts at home is to place them on a baking sheet in the oven or toast them on a stove top pan. Both processes involve warm up time (preheating the oven or warming the pan, respectively) and the use of a cooking sheet or pan; furthermore, because the nuts must be monitored until they are done, burning during toasting is a common complaint. For these reasons nut toasting is generally not done for quick meals, such as breakfast, or for individual meals where the quantity of nuts is small and the time and effort to toast small amounts is seen as prohibitive.

SUMMARY OF THE INVENTION

Embodiments of the present invention provide a food toasting device, or pouch. In some embodiments, the food toasting pouch provides a means for a user to toast nuts directly in their toaster, thereby speeding up the process of toasting nuts, eliminating in at least some embodiments the need for a warm up, eliminating the use of a baking sheet or stovetop pan, and consistently producing the same quality of toasted nuts without burning. The user can use any type of appliance that can be used to warm food items, including but not limited to, an oven, a toaster oven and a toaster. In a preferred embodiment, the home appliance is a toaster—a device already on the kitchen counter and completely suited for the task of toasting.

One embodiment of the invention provides a food toasting pouch comprising a pouch and optionally, a handle.

Another embodiment of the invention provides a method of using the food toasting pouch, comprising adding a desired quantity of a food product into the pouch, placing the pouch into the appliance, turning on the appliance such that the appliance generates a desired amount of heat, waiting a predetermined amount of time until the food product is sufficiently toasted, and removing the food product from the appliance. In some embodiments, the food product is nuts.

BRIEF DESCRIPTION OF THE DRAWINGS

FIG. 6A is an example of a food-grade mesh pouch. FIG. 6B is an example of a food-grade wire mesh basket.

FIGS. 7A and 7B are examples of handles having ergonomically adapted grips. FIG. 7C is an example of a handle comprising a lever that can manipulate the opening and closing of the pouch. FIG. 7D is an example of a handle placed on top of the pouch.

DETAILED DESCRIPTION

Unless otherwise defined, all technical terms used herein have the same meaning as commonly understood by one of ordinary skill in the art to which this disclosure belongs.

The articles "a" and "an" are used herein to refer to one or to more than one (i.e. at least one) of the grammatical object of the article. By way of example, "an element" means at least one element and can include more than one element.

In at least one embodiment of the present invention, the device comprises a pouch and optionally, a handle. As used herein, the term "pouch" includes any form that comprises at least two sides and a bottom, such that when food products (e.g., nuts) are placed inside the pouch they will not spill or leak out. As such, the pouch may be, for example, in the form of a bag or basket. The pouch may be rigid, semi-flexible or flexible. In one embodiment, the pouch is flexible. In some embodiments, the pouch may be of a mesh design or may be loosely woven so as to allow air to circulate around the food inside the pouch and to allow the food to be directly exposed to the heat source, thereby toasting the food in addition to heating the food. The term "toasting" as used herein refers to browning and/or crisping of the food by exposure to heat.

The pouch of the present invention may be made of any material that can withstand the heat of cooking and provide for the food contents to be warmed and/or, in at least some embodiments, toasted. Examples of suitable material include, but are not limited to, metal or other heat resistant materials formed to create said pouch. In other embodiments, the pouch comprises sufficient openings to allow heat to toast the enclosed food product. In a preferred embodiment, a food grade mesh with grid varying in size from pinhole to ⅛ inch opening is used. In another embodiment, the pouch is of a size that fits into a standard size toaster slot.

In one embodiment, the pouch is open at the top portion. In another embodiment, the pouch top is closable. The closing means may be anything suitable to seal the top of the pouch. Such means may include, but are not limited to, a zipper, snap, clasp, latch, flap and the like.

In another embodiment, the pouch may be expandable, equipped with a loading/pouring mechanism, a mechanism to crush the food product, a mechanism to spread the food products evenly inside the container, and combinations thereof.

Figure 1:
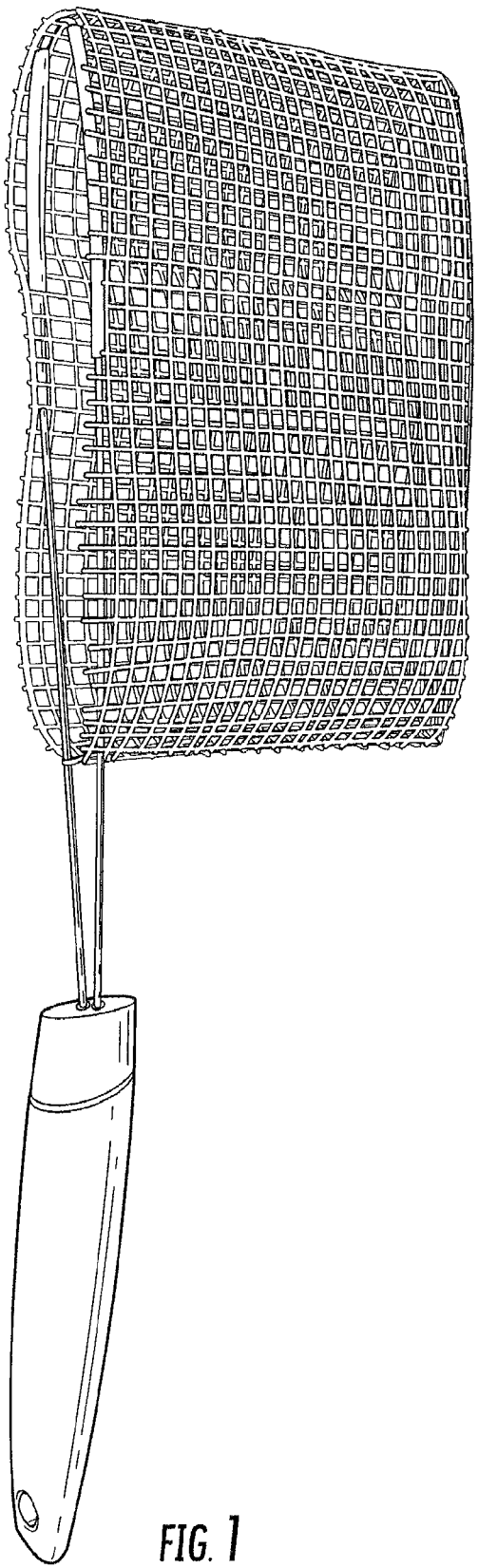
FIG. 1 illustrates one embodiment of the present invention comprising a food grade mesh pouch and a handle.
Figure 2:
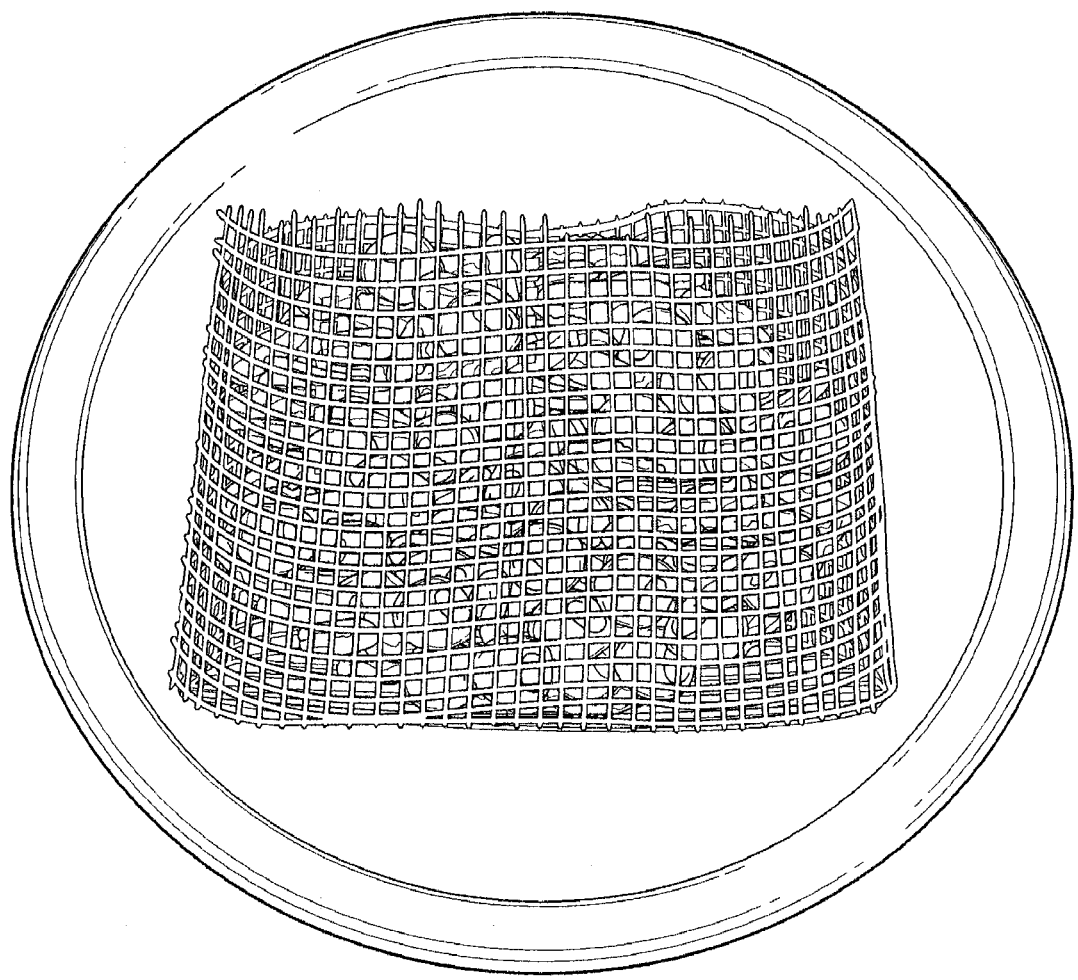
FIG. 2 illustrates another embodiment of the present invention showing a food grade mesh pouch holding nuts (handle not shown).
Figure 3:
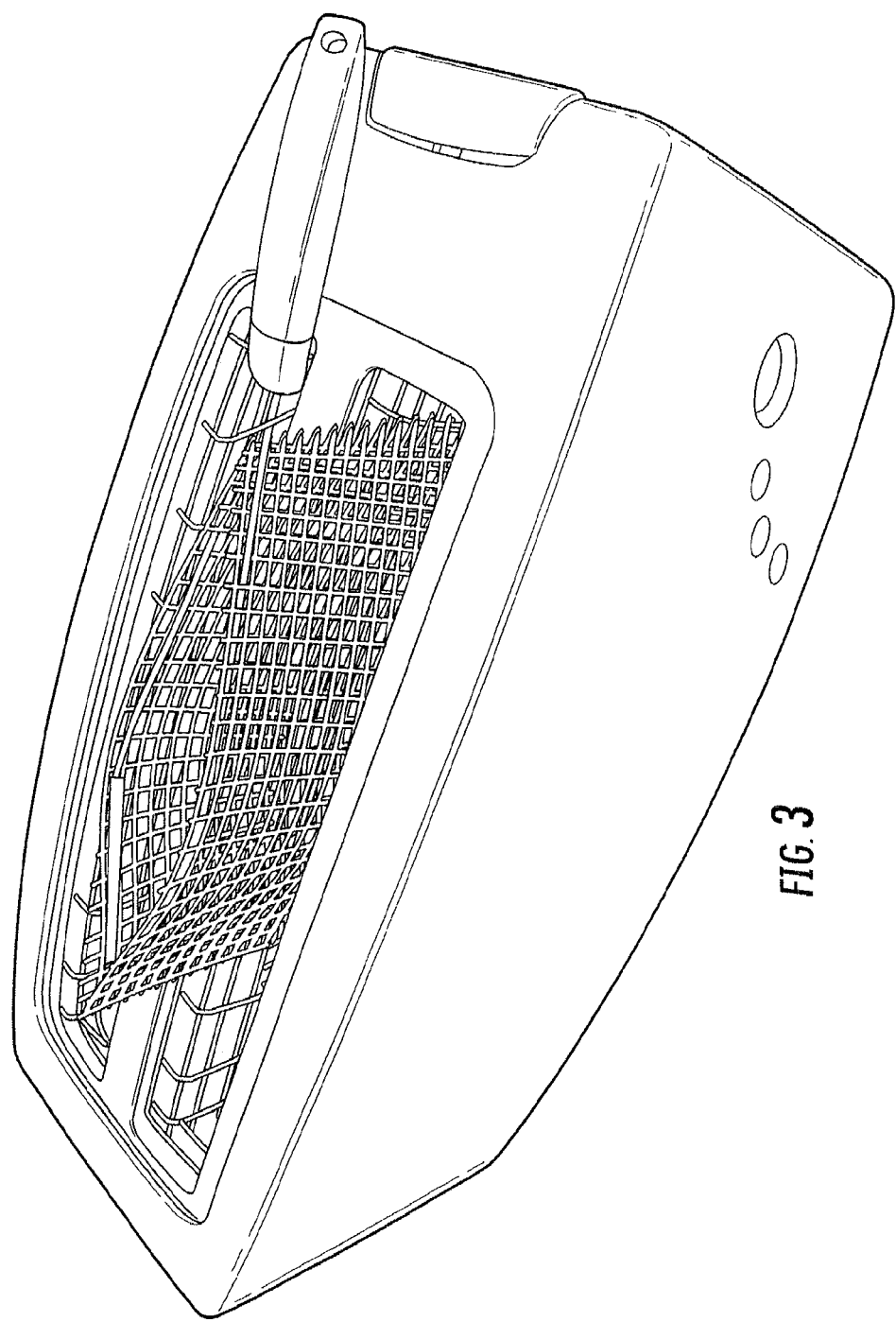
FIG. 3 illustrates another embodiment of the invention placed in the toaster.
Figure 4:
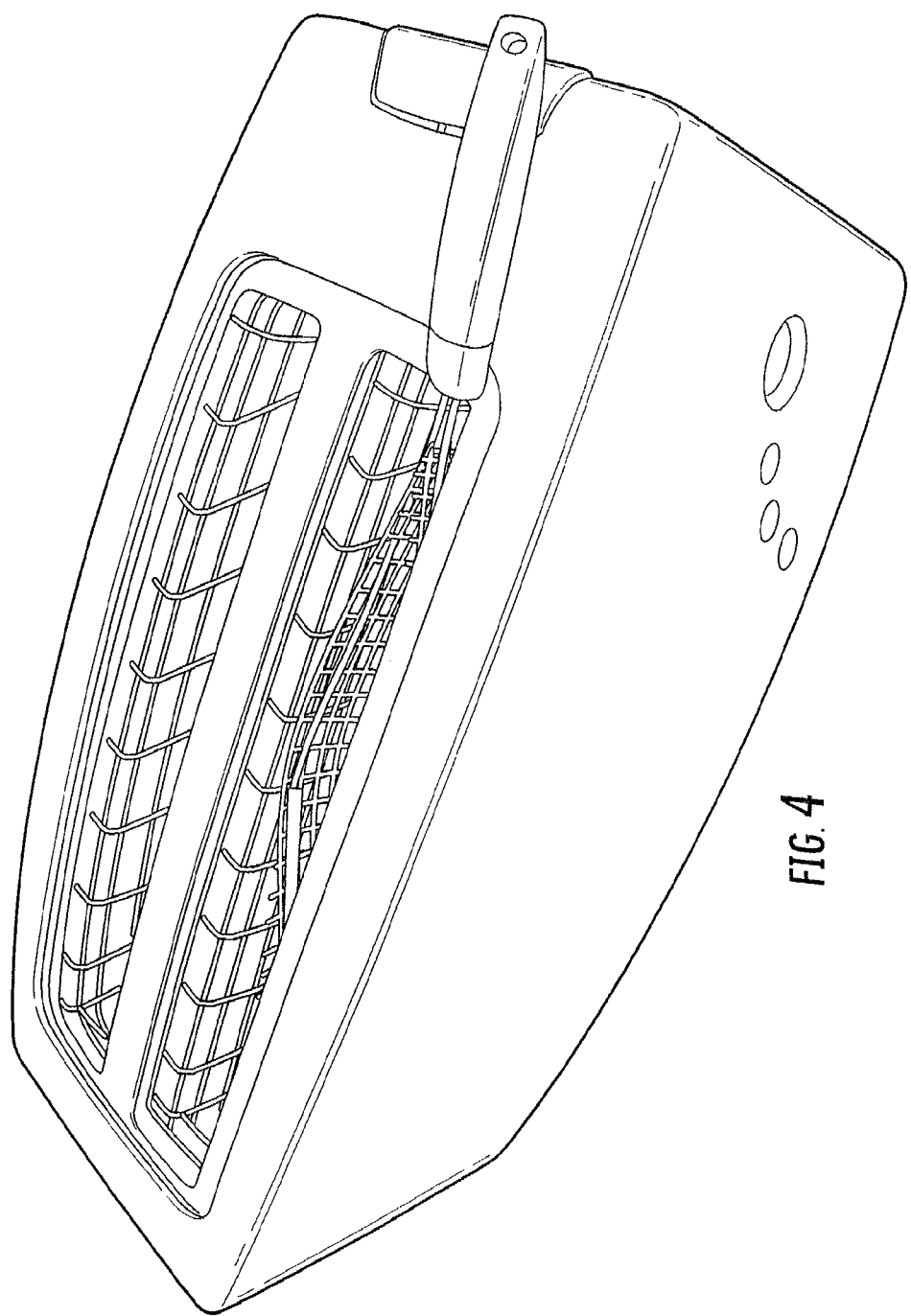
FIG. 4 illustrates another embodiment of the invention wherein nuts placed inside the pouch are toasted.
Figure 5:
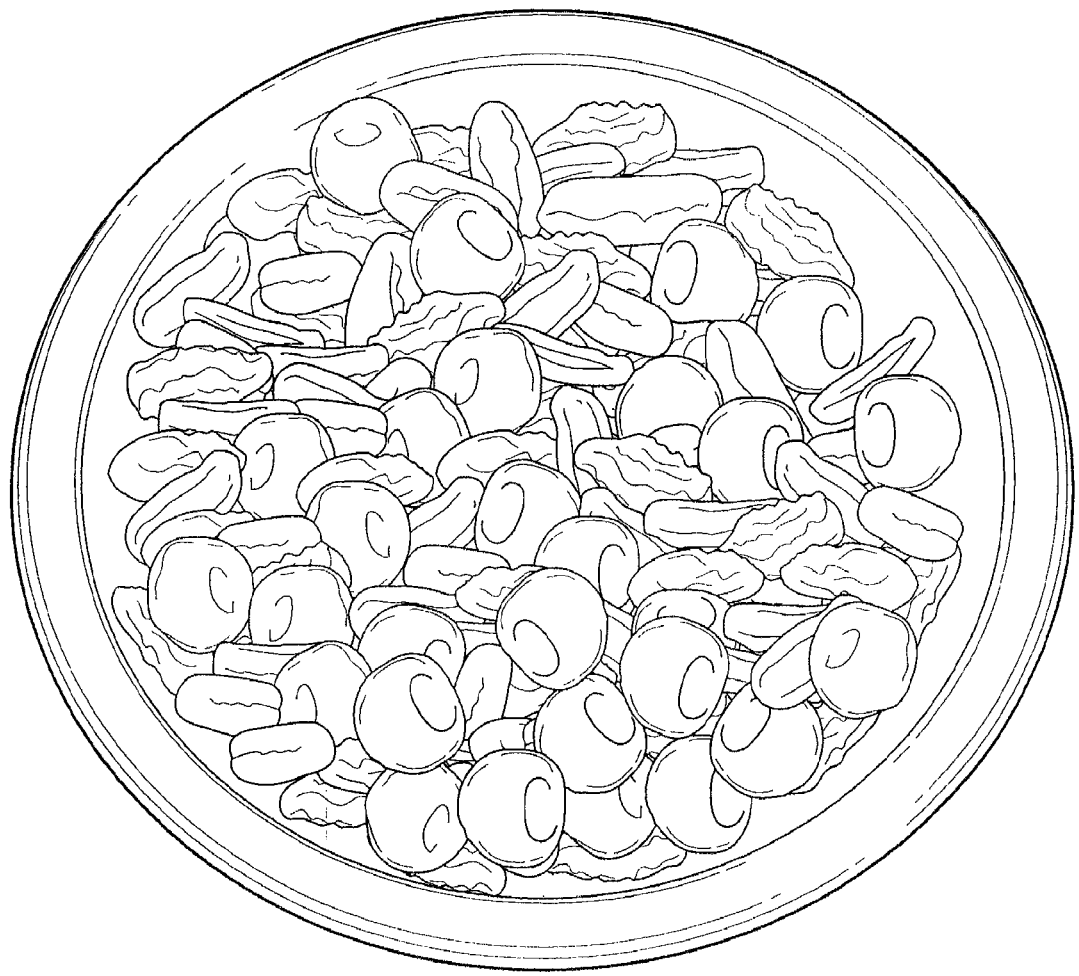
FIG. 5 illustrates nuts toasted with the device of the present invention on a breakfast cereal.
Figure 6A:
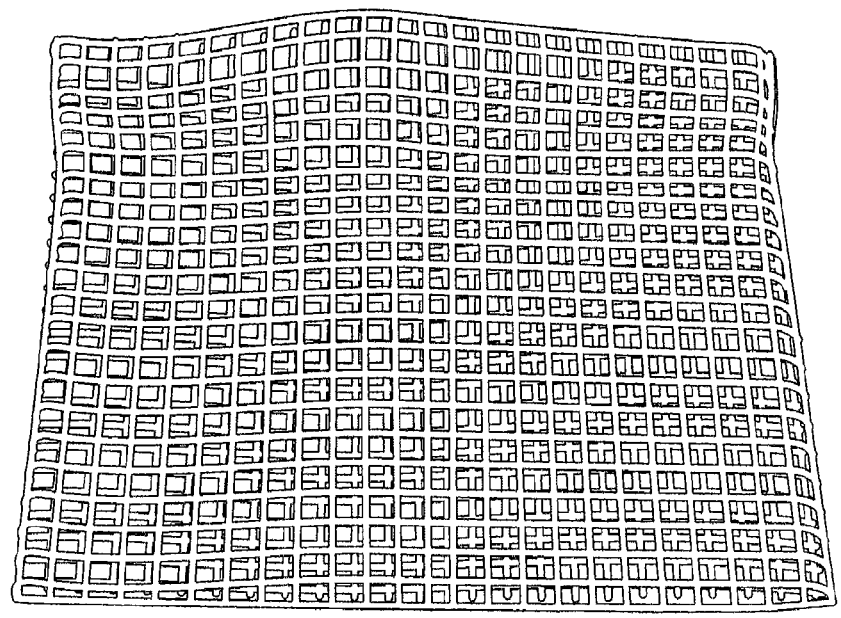
FIGS. 6A and 6B illustrate possible types of pouches that can be used with the present invention.
Figure 6B:
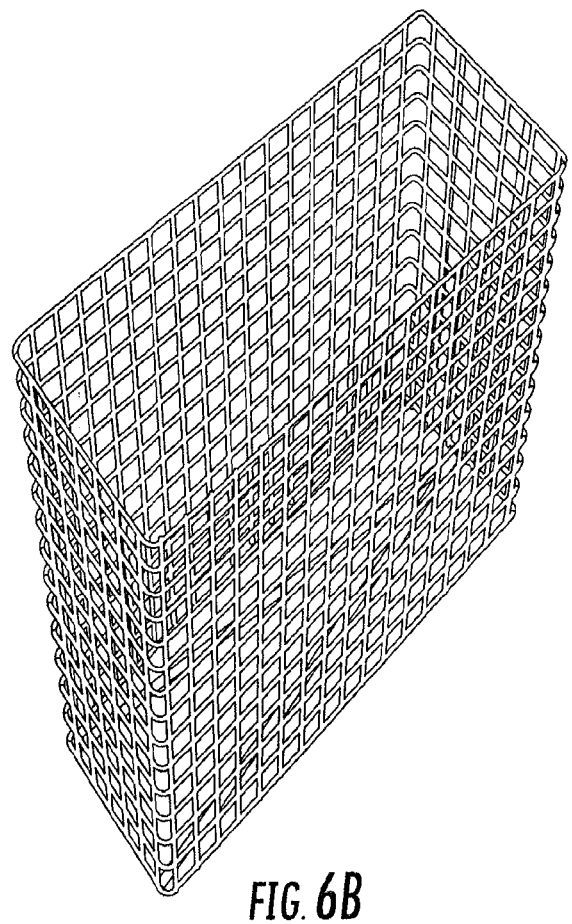
Figure 7B:
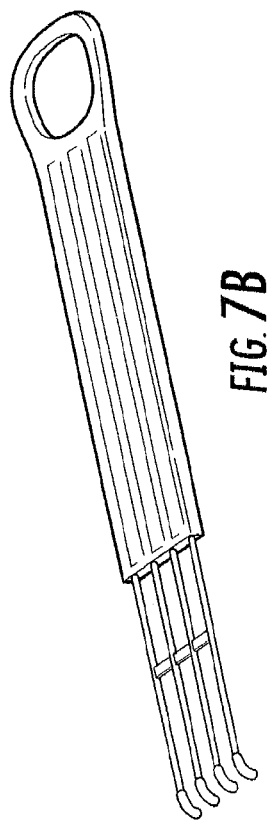
FIGS. 7A-7D illustrate possible types of handles that can be used with the present invention.
Figure 7D:
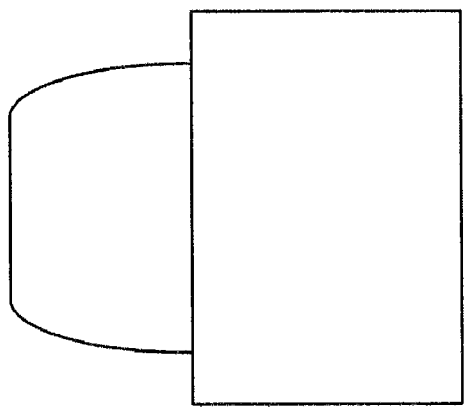
Figure 7A:
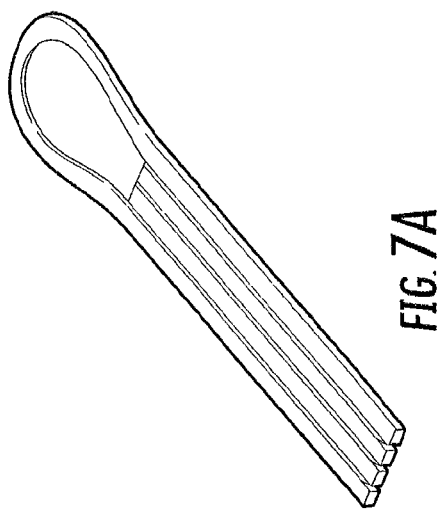
Figure 7C:
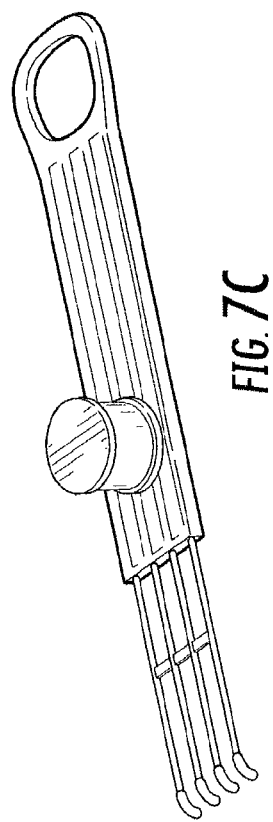

In another embodiment, a handle is attached to the pouch. The handle may be of any size or shape suitable to allow a user to easily grasp. In certain embodiments, the handle is attached to any side of the pouch. As shown in FIG. 1, in one embodiment the handle is attached to the side of the pouch. In another embodiment, and as shown in FIG. 7D, the handle is located at the top of the pouch. In other embodiments, the handle is attachable/removable from the pouch. In yet another embodiment, the handle further comprises a lever, knob or other means to allow the opening, closing, and/or pouring of the food contents. The handle may be made of any suitable materials that provide sufficient strength to support the pouch, including, but not limited to, plastic, wood, metal, and the like. It is also within the scope of the invention that the handle comprise ergonomic grips, such as a rubber covering or specially formed contours to aid in the grasping of the handle.

As used herein, the term "appliance" refers to any heating device suitable for the warming/heating of food. Examples, include, but are not limited to, an oven, a toaster oven, a toaster, and the like. In a preferred embodiment, the appliance is a toaster.

Another embodiment of the invention provides for a method of warming a food product (e.g., nuts) using the device of the present invention. In one embodiment, the user pours the desired quantity of food (e.g., nuts) into the pouch, places the pouch in the appliance (e.g., toaster), and activates the appliance as usual such that said appliance warms the food. After a predetermined time that is of sufficient length to warm the food product to the desired temperature, the user removes the pouch, opens the pouch (if the pouch is of the type that closes), and pours the food product out of the pouch.

In one embodiment wherein the appliance is a toaster, (and as shown in FIGS. 1-5), the user would set the toaster to the desired setting, place the pouch within the slot, activate the toaster place depressing the lever mechanism, wait the desired time until the food product is sufficiently warmed, remove the pouch from the toaster, open the pouch (if the pouch is closed), and pour the nuts out of the pouch. In some embodiments, the pouch will comprise a handle, wherein the handle may also be used to open the pouch, by means of a lever on top of the handle, and wherein the user can use the handle to place the pouch into, and remove the pouch from, the toaster.

The invention has been described with reference to various specific and illustrative embodiments and techniques. However, it should be understood that many variations and modifications may be made while remaining within the spirit and scope of the invention.

The invention claimed is:

1. A food toasting device comprising a pouch, wherein the pouch comprises at least a top and two sides, and is configured to contain a food product without spillage while allowing the food product to be directly exposed to a heat source, wherein the pouch is configured to be without restriction to one orientation during use, wherein the pouch is completely closed with a zipper, a clasp, a latch, a flap or a snap and the heat source is an oven.

2. The food toasting device of claim 1, wherein the pouch comprises a food grade mesh.

3. The food toasting device of claim 1, further comprising a handle.

4. The food toasting device of claim 3, wherein the handle further comprises a lever mechanism, whereby the lever mechanism opens and closes the pouch.

5. A method of heating and removing a food product in /from the food toasting device pouch comprising: placing a food product in the food toasting device pouch, the pouch is configured to be without restriction to one orientation during use, wherein the pouch comprises at least a top and two sides, and is configured to contain a food product without spillage while allowing the food product to be directly exposed to a heat source, wherein the pouch is configured to be without restriction to one orientation during use; placing the pouch into an appliance; warming the food product in the appliance after a predetermined amount of time; removing the pouch from the appliance; and removing the food product from the pouch, wherein the pouch is completely closed with a zipper, a clasp, a latch, a flap or a snap and the appliance is an oven.

6. The method of claim 5, wherein the appliance is an oven, a toaster oven, or a toaster.

7. The method of claim 6, wherein the appliance is a toaster.

8. The method of claim 5, further comprising the step of closing the pouch prior to placing the pouch into the appliance.

9. The method of claim 8, further comprising the step of opening the pouch prior to removing the food product from the pouch.

10. The method of claim 5, wherein the warming the food product in the appliance further comprises toasting the food product in the appliance.

11. The food toasting device of claim 1, wherein the pouch is rigid, semi-flexible or flexible.

12. The food toasting device of claim 11, wherein the pouch is flexible.

13. The food toasting device of claim 12, wherein the pouch is made of heat resistant materials.

14. The food toasting device of claim 2, wherein the food grade mesh includes a grid with openings varying in size from pinhole to percentages of an inch.

\* \* \* \* \*